(12) United States Patent
Agon et al.

(10) Patent No.: US 6,434,655 B1
(45) Date of Patent: Aug. 13, 2002

(54) FAST ACCESS TO BUFFER CIRCUITS

(75) Inventors: Francois Agon, Crolles; Mark Vos, Grenoble, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/324,338

(22) Filed: Jun. 2, 1999

(30) Foreign Application Priority Data

Jun. 4, 1998 (FR) .............................................. 98 07013

(51) Int. Cl.$^7$ ................................................ G06F 12/00
(52) U.S. Cl. ........................ 710/310; 710/53; 711/154; 365/189.05; 365/189.08
(58) Field of Search ....................... 365/189.01, 189.02, 365/189.05, 189.08; 710/52, 53, 54, 305, 310; 711/118, 119, 133, 134, 136, 154, 159, 160

(56) References Cited

U.S. PATENT DOCUMENTS

| | | | | |
|---|---|---|---|---|
| 5,163,132 A | | 11/1992 | DuLac et al. ................ | 395/275 |
| 5,598,554 A | * | 1/1997 | Litaize et al. ........... | 365/189.05 |
| 5,768,624 A | * | 6/1998 | Ghosh ........................... | 710/53 |
| 5,882,996 A | * | 3/1999 | Dai ............................. | 438/597 |
| 5,960,468 A | * | 9/1999 | Paluch ......................... | 710/57 |
| 6,026,048 A | * | 2/2000 | Wada ..................... | 365/189.05 |
| 6,031,785 A | * | 2/2000 | Park et al. ............. | 365/189.04 |
| 6,101,135 A | * | 8/2000 | Lee ........................ | 365/189.01 |
| 6,222,767 B1 | * | 4/2001 | Kendall et al. ........ | 365/185.12 |

FOREIGN PATENT DOCUMENTS

JP 6 215 918 6/1987

* cited by examiner

Primary Examiner—Matthew Kim
Assistant Examiner—Christian P. Chace
(74) Attorney, Agent, or Firm—Lisa K. Jorgenson; Allen, Dyer, Doppelt, Milbrath & Gilchrist, P.A.

(57) ABSTRACT

A device and associated methods for the storage and retrieval of data elements in a buffer circuit include each data element being transmitted to the buffer circuit through a transmission bus and a bus interface. A data element is stored in a memory when a first register is not empty. Additionally, when the first register is not empty, a data element is also stored in an additional register directly accessible by a decoding interface. The time of access to the data elements in the buffer circuit may be reduced.

24 Claims, 2 Drawing Sheets

FAST ACCESS TO BUFFER CIRCUITS

FIELD OF THE INVENTION

The invention relates to a buffer circuit and, more particularly, to a buffer circuit of an external memory interface of a microprocessor, with fast access to data elements contained in the buffer circuit.

BACKGROUND OF THE INVENTION

The external memory interface of a complex circuit such as a microprocessor has to manage communication with the microprocessor in both directions; i.e., from the microprocessor to the external memory interface and from the external memory interface to the microprocessor. The communication is carried out in the form of information element exchanges, usually by a wired link called a two-way transmission bus. The information elements may be memory addresses, data elements or control instructions.

The information elements are in the form of binary data elements which constitute words. The information elements flow from the microprocessor to the external memory interface when requests for access to the external memory are sent by the microprocessor. The information elements flow from the external memory interface to the microprocessor when the appropriate responses to these requests are sent back. In both cases, the information elements flow via the transmission bus.

The external memory interface must therefore have two buffer circuits available: an input buffer circuit and an output buffer circuit. The requests for access to the external memory sent by the microprocessor are stored in the input buffer circuit of the external memory interface. These requests are then decoded by the external memory interface. Through this decoding, the memory addresses to be accessed as well as the required type of access are obtained. This go required type of access may be a write mode access or a read mode access. It is only then that the real access to the external memory is effective. When reading the external memory, a word that is read is stored in the output buffer circuit of the external memory interface. It is then sent to the microprocessor via the transmission bus.

This transfer of information may be disturbed for various reasons. The rate of information transfer is set by a clock. The transfer may be totally blocked for several clock cycles. Now the external memory interface cannot meet the requests for access to the external memory if a previous access to this external memory has not yet been processed. Furthermore, a response to a request for access to the external memory cannot be sent by the transmission bus if another exchange of information has taken place at the same time on this transmission bus. These possible disturbances in information exchanges necessitate an internal memory in the input and output buffer circuits of the external memory interface.

The following description shall refer solely to the input buffer circuit of an external memory interface both in the explanation of the prior art and in the context of the presentation of the invention in itself. However, it will be clear that the buffer circuit according to the invention may be applied to any other interface whose performance characteristics can be improved by the circuit according to the invention.

FIG. 1 is a block diagram of the conventional and essential elements involved during the information exchanges between a complex circuit, such as a microprocessor, and an external memory interface. A microprocessor 1 is connected to an external memory interface 2 via a transmission bus 22. This transmission bus 22 conveys the data to a buffer circuit 3 of the external memory interface 2. This buffer circuit 3 includes an input buffer circuit 4 and an output buffer circuit 5. The input buffer circuit 4 receives the access request from the microprocessor 1. The output buffer circuit 5 sends the responses to these requests after completion of a processing operation. A memory space 7 of an external memory 8, which is the object of the request, may be read, written in or erased through the memory access 6.

FIG. 2 shows a prior art input buffer circuit of an external memory interface. This input buffer circuit 20 may be the type of input buffer circuit 4 contained in the external memory interface described in FIG. 1. The input buffer circuit 20 receives the transmission bus 22 at an input 21. The requests for access to the external memory that are conveyed by the transmission bus 22 are received by a bus interface 23. This bus interface 23, of a register type, outputs an INW signal. A link 24 connects the bus interface 23 and a first input E1 of a first multiplexer 25. A link 27 connects a connection point 26 of the link 24 and a RAM memory 28. A link 29 connects the RAM memory 28 and a second input E2 of the first multiplexer 25. A link 211 connects an output S1 of the first multiplexer 25 and an input E3 of a register 212. At an output S2, the register 212 provides an output signal OUTW to a decoding interface 213 of the external memory interface.

The description of the operation of the circuit shown in FIG. 2 follows. The requests for access to the external memory are received by the bus interface 23. If all the previous requests have been processed, the RAM memory 28 is empty and is not active. The last request sent by the microprocessor is directly transmitted to the first register 212 through the first input E1 of the first multiplexer 25 and the links 24 and 211 in the form of the signal INW. This request may then be directly exploited by the decoding interface 213.

If one or more requests have not yet been processed at the time of the reception of a new request by the bus interface 23, then the RAM memory 28 is not empty. In this case, and also when the data transfer is blocked, the request or requests that reach the input buffer circuit are written in the RAM memory 28. When a request is read in the RAM memory 28, it is transmitted to the first register 212 via the second input E2 of the first multiplexer 25 and the links 29 and 211. The RAM memory 28 used in this type of buffer circuit does not provide the capability to read a data element during a clock period when this data element is written (this characteristic is known as a "no read through capability").

The rates of the transmissions between the complex circuit or microprocessor and the external memory interface are set by a clock. When a data element is written in a specific memory space of the RAM memory 28 during a specified clock period, this very same memory space of the RAM memory 28 is accessible in read mode at the next clock cycle only. Consequently, the data element is transmitted to the first register 212 only two clock periods after the clock period corresponding to the writing of the data element in the RAM type memory 28. There is thus a loss of time in the transmission of data elements between the bus interface 23 and the decoding interface 213. Indeed, a period of time equal to the duration of a clock period is lost. We will now refer to the existence of a latency cycle.

FIG. 3 shows a timing diagram with four timing lines 31–34. The first timing line 31 shows the clock signal. The second timing line 32 shows the write access to the RAM memory 28. The third timing line 33 shows the read access to the RAM memory 28. The fourth timing line 34 shows the state of the first register 212. For this timing diagram, the X-axis indicates the passage of time. It is subdivided into four equal time intervals. Each of the four time intervals corresponds to a clock period.

A memory space of the RAM memory 28 is written in during the first clock period. This write access is represented in the second timing line 32 by a high level pulse. During this first clock period, this memory space of the RAM memory 28 changes its value and cannot be read. This new and correct value is available at the same memory space of the RAM memory 28 during the second clock period. This possible read access is represented in the third timing line 33 by a high level pulse. The new value will therefore be available in the first register for the decoding interface during the third clock period. This availability is represented in the fourth timing line 34 by a high level pulse. Thus, when the data transfer is disturbed, for any reason, during a given clock period and when these conditions of disturbance disappear during the next clock period, the time equivalent of one clock period is lost in the transmission between the microprocessor and the external memory interface.

The transmission disturbance conditions are evaluated during each clock period. This evaluation is exploited during the next clock period. In any case, a data element that has not been transmitted to the output of the buffer circuit must remain available in the buffer circuit.

SUMMARY OF THE INVENTION

An object of the present invention therefore is to obtain a buffer circuit that does not have the drawbacks of the prior art described above, namely a loss of time, under certain conditions, that is equivalent to one clock period. This object is achieved by providing a buffer circuit to which a second register and a second multiplexer have been added.

When a request is sent to the external memory, the data elements may then also be written in the second register. Thus, under certain conditions which shall be presented further below, the data elements will be available with one clock period in advance with respect to the prior art buffer circuit described above. Thus, the second multiplexer selects the output of the second register.

The invention also relates to a method for the storage and retrieval of data elements in a buffer circuit. This method includes the steps of transmitting each data element to the buffer circuit through a transmission bus and a bus interface, and writing each data element in a first register of the buffer circuit to make it available at the output of the buffer circuit if the first register is empty. Further, each data element is stored in a first RAM memory if the first register contains another data element. Moreover, a last transmitted data element is written in a second register of the buffer circuit to make it available at output of the buffer circuit simultaneously with it being written, as the case may be, in the RAM memory.

BRIEF DESCRIPTION OF THE DRAWINGS

The various aspects and advantages of the invention shall appear hereinafter in the description with reference to the figures which are given only by way of example and are not intended to restrict the scope of the invention.

DETAILED DESCRIPTION OF THE PREFERRED EMBODIMENTS

Figure 1:
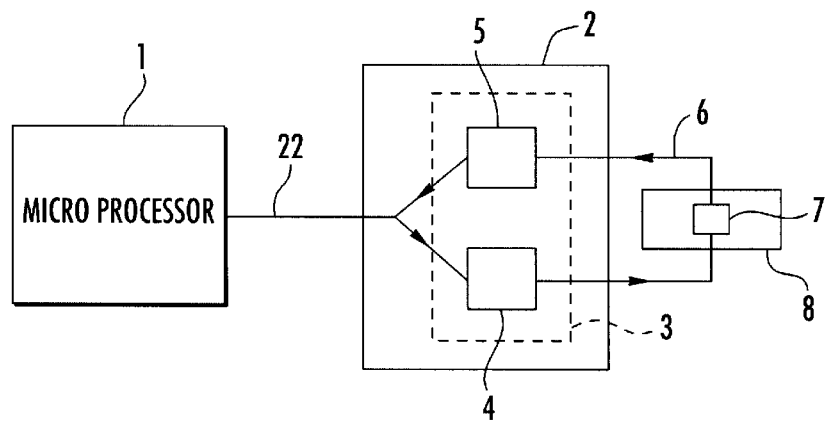
FIG. 1, described above, is a block diagram of the conventional elements involved during the exchange of information between a complex circuit and an external memory interface.
Figure 2:
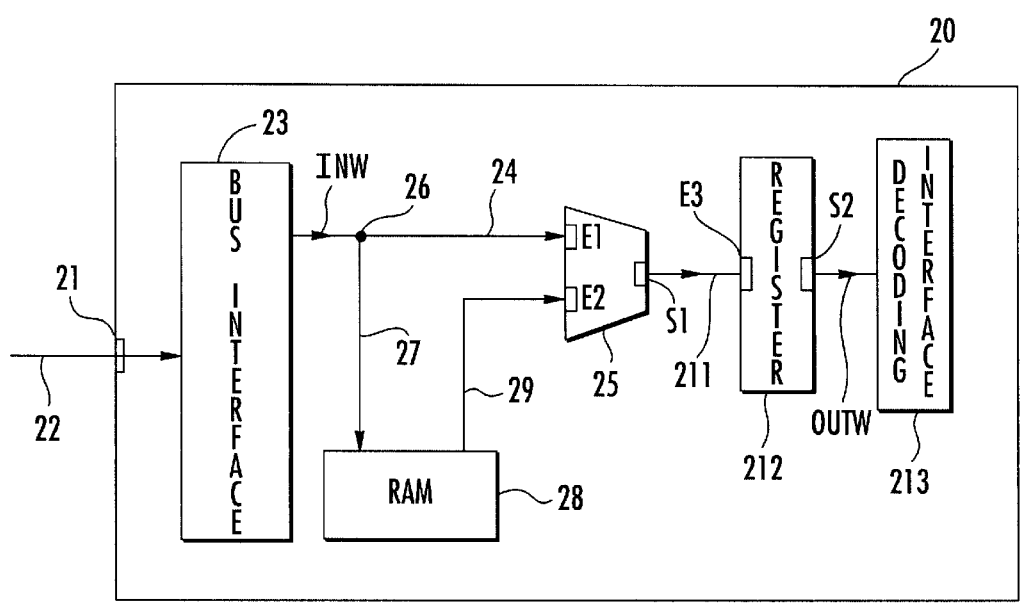
FIG. 2, also described above, schematically illustrates a prior art input buffer circuit of an external memory interface.
Figure 3:
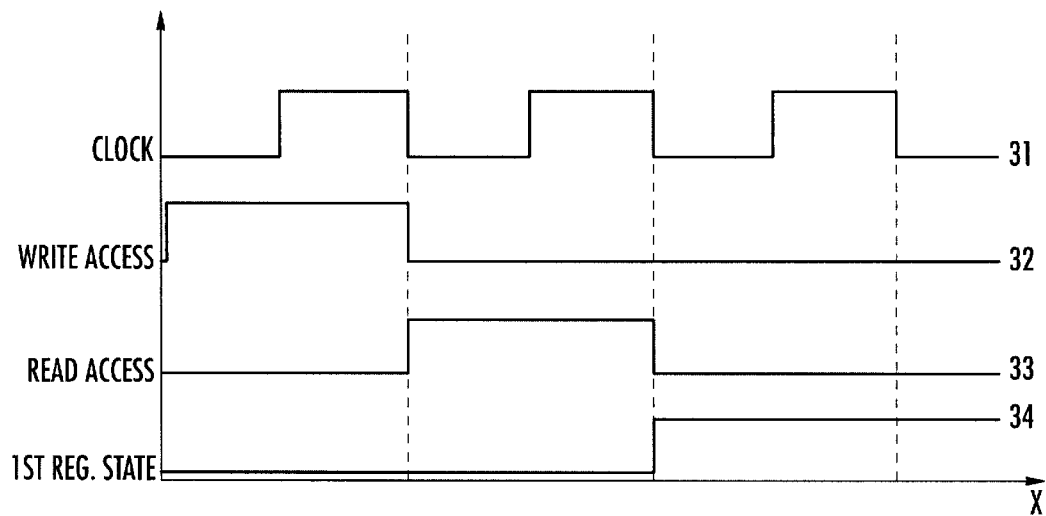
FIG. 3, also described above, is a timing diagram illustrating four timing lines showing the progress, in time, of various functions involved in the information exchange.
Figure 4:
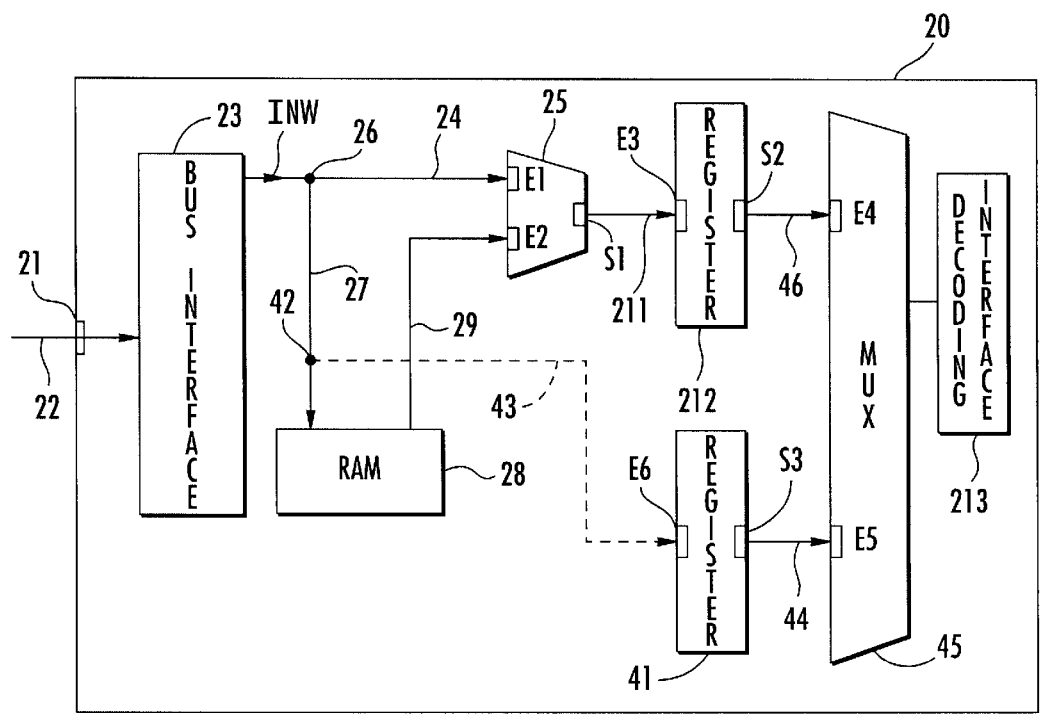
FIG. 4 schematically illustrates an input buffer circuit of an external memory interface according to the invention.

The drawing of FIG. 4 illustrates an input buffer circuit of the present invention in which elements in common with FIG. 2 have the same reference numbers referred to in the description of FIG. 2. The input buffer circuit 20 receives the transmission bus 22 at an input 21.The requests for access to the external memory conveyed by the transmission bus 22 are received by a bus interface 23. The bus interface 23 outputs a signal INW. A link 24 connects the bus interface 23 and a first input E1 of a first multiplexer 25. A link 27 connects a connection point 26 of the link 24 and a RAM memory 28. A link 29 connects the memory 28 and a second input E2 of the first multiplexer 25.

Additionally, the input buffer circuit includes a connection point 42 on the link 27. A link 43 connects the point 42 and an input E6 of a second register 41. A link 44 connects an output S3 of the second register 41 and a first input E5 of a second multiplexer 45. A link 46 connects the register 212 and a second input E4 of the second multiplexer 45.

The operation of the circuit of FIG. 4 depends on certain conditions. These conditions are related to the occurrence of data transmission disturbances and to the number of words stored in the RAM memory 28 when the transmission is disturbed. The Table 1 presented below corresponds to an example where the first word W1 occupies the first register 212 and where a single additional word reaches the circuit through the transmission bus interface 23.

This example may be studied over a time range of three clock periods. The transmission is blocked at the first clock period. Each clock period corresponds to one column of the table. The first row of Table 1 corresponds to the number of the clock period. The second row of Table 1 corresponds to the operations performed, in this example, with the prior art circuit shown in FIG. 2. The third row of Table 1 corresponds to the state (blocked or normal) of the transmission. The fourth row of Table 1 corresponds to the operations performed by the circuit presented in FIG. 4. The fifth and last row of the table indicates the word available as well as the register in which it is available at output of the external memory interface.

The first register 212 contains a first word W1. During the first clock period, a second word W2 reaches the bus interface 23. In accordance with the prior art, it is written in a memory space of the RAM type memory unit. According to the invention, it is also written in the second register 41 via the link 43. During the second clock period, the transmission of data has become normal. The second word W2 which was contained in the first register 41 is then available upon the second clock period for the decoding interface 213. During the third clock period, the second word W2 is again available from the first register 212 in accordance with the prior art.

TABLE 1

| Clock Period | 1 | 2 | 3 |
|---|---|---|---|
| Operations of the prior art circuit | Writing of W2 in RAM | Reading of W2 in RAM | |
| Transmission Operations of the circuit according to the invention | Blocked Writing of W2 in -RAM -register 41 | Normal | |
| Word available | W1 (register 212) | W2 (register 41) | W2 (register 212) |

From the third clock period, the input buffer circuit operates in a similar manner to the circuit of FIG. 2. The second register 41 is available as soon as the word that it contains is transmitted to the decoding interface 213 or a new word arrives by the interface bus 23. It may be updated again with a third word coming from the bus interface if necessary.

Firstly, a case where the transmission is blocked during the first clock period, and is normal starting from the following clock period, will be discussed. A first word W1 is contained in the first register 212. During the first clock period a second word W2 is written in the RAM memory 28. It is simultaneously written in the second register 41. During the second clock period, the second word W2 is directly available for the decoding interface 213 via the second register 41. If a third word W3 is transmitted during the second clock period to the input buffer circuit of the external memory interface, it is written in another memory space of the RAM memory 28. It is simultaneously written in the second register 41 that has become available.

During the third clock period, the third word W2 is available for the decoding interface 213 by the second register 41. It is noted that, at the same time, the second word W2 is available in the first register 212 as seen in the operation of the prior art circuit presented in FIG. 2. However, the second multiplexer two registers for output of the buffer circuit if this data element has not already been transmitted. Now in this case, the second word W2 has already been transmitted to the decoding interface 213. It is therefore the third word W2 that is selected.

Again, as in the operation of the prior art circuit shown in FIG. 2, the memory space of the RAM memory 28, in which the third word W2 had been recorded, is read. At the fourth clock period, the third word W2 may thus be transmitted to the decoding interface 213 via the first register 212. If no new word is available at the output of the bus interface 23, the circuit resumes an operation similar to the prior art circuit described in FIG. 2.

A synthesis of all these operations is given in Table 2 below. An additional column with respect to Table 1 has been added. This additional column corresponds to the fourth clock period. The rows of Table 2 describe the same functions as the rows of Table 1.

TABLE 2

| Clock period | 1 | 2 | 3 | 4 |
|---|---|---|---|---|
| operations of the prior art | writing of W2 in RAM | -reading of W2 in RAM | -reading of W3 in RAM | |
| transmission operations of the circuit according to the invention | blocked writing of W2 in -RAM -register 41 | normal writing of W2 in -RAM -register 41 | -writing of W3 in RAM normal writing of W3 in -RAM -register 41 | normal |
| word available | W1 (register 212) | W2 (register 41) | W2 (register 212) W3 (register 41) | W3 (register 212) |

A final example shall be described in detail. This example is similar to the previous one except that the transmission is again blocked during the third clock period. The operation of the circuit described in FIG. 4 is thus similar, for the first two clock periods, with the operation of the previous example synthesized in Table 2.

During the third clock period, the transmission is blocked. The word available at output must therefore be the same as the one available at output during the second clock period, so that no data is lost. It is the second word W2 that must therefore be available at output of the external memory interface. It is enough to switch over the second multiplexer 45 to meet this requirement of operation. It is the second word W2 that is available via the first register 212. Thus, the value of the output word is maintained, whereas the origin of this word is changed. However, since the transmission is blocked, no reading and especially no reading of the third word W2 is performed in the RAM memory 28.

During the fourth clock period, if the state of the transmission has returned to normal, the third word W2 is immediately available through the second register 41. This was not the case with the prior art circuit presented in FIG. 2. A synthesis of all these operations is given in Table 3 here below.

TABLE 3

| Clock period | 1 | 2 | 3 | 4 |
|---|---|---|---|---|
| operations of the prior art | writing of W2 in RAM | -reading of W2 in RAM -writing of W3 in RAM | no reading of W3 in RAM | reading of W3 in RAM |
| transmission operations of the circuit according to the invention | blocked writing of W2 in -RAM -register 41 | normal writing of W3 in -RAM -register 41 | blocked | normal |
| word available | W1 (register 212) | W2 (register 41) | W2 (register 212) | W3 (register 41) |

Generally, the oldest data element contained in the RAM memory 28 is written in the first register 212 when the first register 212 of the buffer circuit is released. The second multiplexer connected to the first register 212 of the buffer circuit and to the second register 41 of the buffer circuit selects the oldest data element stored in one of the two registers 41 and 212 to make the data element available at output of the buffer circuit 20 if this data element has not already been output from the buffer circuit 20. The second multiplexer selects the most recent data element stored in one of the two registers 41 and 212 to make the data element available at output of the buffer circuit 20 if the oldest data element stored in one of these two registers has already been output from the buffer circuit 20.

A control device programmed beforehand or made in an equivalent manner by a logic circuit, not shown in the figures, manages the switching operations of the different multiplexers so as to obtain conformity with the operation explained in the description. Thus, when the transmission blocking conditions appear during several clock pulses, the transmission time is shorter if these transmission blocking conditions ultimately disappear.

That which is claimed is:

1. A buffer circuit for an external memory interface, the buffer circuit comprising:
    an interface to receive data elements;
    a first multiplexer having an output and first and second inputs, the first input being connected to the interface;
    a first register connected to the output of the first multiplexer, to store each data element;
    a memory connected between the interface and the second input of the first multiplexer to store data elements when the first register is full;
    a second register connected to the interface, to also store data elements when the first register is full;
    a second multiplexer to select data elements from the first and second registers for output from the buffer circuit.

2. A buffer circuit according to claim 1, wherein the second multiplexer selects an oldest data element from one of the first and second registers for output from the buffer circuit if the oldest data element has not already been output; and wherein the second multiplexer selects a newest data element from one of the first and second registers for output from the buffer circuit if the oldest data element has already been output.

3. A buffer circuit according to claim 1, further comprising a decoding interface connected to the second multiplexer.

4. A buffer circuit according to claim 1, wherein the second register is available as soon as a data element that it contains is output or a next data element arrives via the interface.

5. A buffer circuit according to claim 1, wherein the first register stores an oldest data element contained in the memory, when the first register becomes available.

6. An external memory interface for connection between a microprocessor and an external memory, the external memory interface comprising:
    an output buffer circuit operable with the external memory; and
    an input buffer circuit operable with the external memory, the input buffer circuit comprising
        a bus interface to receive data elements,
        a first multiplexer having an output and first and second inputs, the first input being connected to the bus interface,
        a first register connected to the output of the first multiplexer, to store each data element,
        a memory connected between the bus interface and the second input of the first multiplexer to store data elements when the first register is full,
        a second register connected to the bus interface, to also store data elements when the first register is full, and
        a second multiplexer to select data elements from the first and second registers for output from the input buffer circuit.

7. An external memory interface according to claim 6, wherein the second multiplexer selects an oldest data element from one of the first and second registers for output from the input buffer circuit if the oldest data element has not already been output; and wherein the second multiplexer selects a newest data element from one of the first and second registers for output from the input buffer circuit if the oldest data element has already been output.

8. An external memory interface according to claim 6, further comprising a decoding interface connected to the second multiplexer.

9. An external memory interface according to claim 6, wherein the second register is available as soon as a data element that it contains is output or a next data element arrives via the bus interface.

10. An external memory interface according to claim 6, wherein the first register stores an oldest data element contained in the memory, when the first register becomes available.

11. A circuit comprising:
    a microprocessor;
    an external memory; and
    an external memory interface for managing communication between the microprocessor and the external memory, the external memory interface comprising
        an output buffer circuit operable with the external memory, and
        an input buffer circuit operable with the external memory, the input buffer circuit comprising
            a bus interface to receive data elements,
            a first multiplexer having an output and first and second inputs, the first input being connected to the bus interface,
            a first register connected to the output of the first multiplexer, to store each data element,
            a memory connected between the bus interface and the second input of the first multiplexer to store data elements when the first register is full,
            a second register connected to the bus interface, to also store data elements when the first register is full, and
            a second multiplexer to select data elements from the first and second registers for output from the input buffer circuit.

12. A circuit according to claim 11, wherein the second multiplexer selects an oldest data element from one of the first and second registers for output from the input buffer circuit if the oldest data element has not already been output; and wherein the second multiplexer selects a newest data element from one of the first and second registers for output from the input buffer circuit if the oldest data element has already been output.

13. A circuit according to claim 11, further comprising a decoding interface connected to the second multiplexer.

14. A circuit according to claim 11, wherein the second register is available as soon as a data element that it contains is output or a next data element arrives via the bus interface.

15. A circuit according to claim 11, wherein the first register stores an oldest data element contained in the memory, when the first register becomes available.

16. A method for the storage and retrieval of data elements in a buffer circuit comprising the steps of:
    transmitting each data element to the buffer circuit through a transmission bus and a bus interface;
    storing each data element in a first register of the buffer circuit when the first register is empty, to make it available at an output of the buffer circuit;

storing each data element in a RAM when the first register is not empty; and storing a last transmitted data element in a second register of the buffer circuit to simultaneously make it available at the output of the buffer circuit.

17. A method for the storage and retrieval of data elements in a buffer circuit according to claim 16, wherein the second register is available as soon as a data element that it contains is output or a next data element arrives via the bus interface.

18. A method for the storage and retrieval of data elements in a buffer circuit according to claim 16, further comprising the step of storing an oldest data element, contained in the RAM, in the first register when the first register becomes available.

19. A method for the storage and retrieval of data elements in a buffer circuit according to claim 16, further comprising the step of selecting, with a multiplexer connected to the first and second registers, an oldest data element stored in one of the first and second registers to make it available at the output of the buffer circuit when the oldest data element has not already been output from the buffer circuit.

20. A method for the storage and retrieval of data elements in a buffer circuit according to claim 16, further comprising the step of selecting, with a multiplexer connected to the first and second registers, a most recent data element stored in one of the first and second registers to make it available at the output of the buffer circuit when an oldest data element stored in one of the first and second registers has already been output from the buffer circuit.

21. A method for the storage and retrieval of data elements in a buffer circuit comprising the steps of:

storing each data element in a first register of the buffer circuit when the first register is empty, to make it available at the output of the buffer circuit;

storing each data element in a memory when the first register is full; and storing a last transmitted data element in a second register of the buffer circuit when the first register is full, to simultaneously make it available at the output of the buffer circuit.

22. A method for the storage and retrieval of data elements in a buffer circuit according to claim 21, wherein the second register is available as soon as a data element that it contains is output or a next data element arrives.

23. A method for the storage and retrieval of data elements in a buffer circuit according to claim 21, further comprising the step of storing an oldest data element, contained in the memory, in the first register when the first register becomes available.

24. A method for the storage and retrieval of data elements in a buffer circuit according to claim 21, further comprising the steps of:

selecting, with a multiplexer connected to the first and second registers, an oldest data element stored in one of the first and second registers to make it available at the output of the buffer circuit when the oldest data element has not already been output from the buffer circuit; and selecting, with the multiplexer connected to the first and second registers, a most recent data element stored in one of the first and second registers to make it available at the output of the buffer circuit when an oldest data element stored in one of the first and second registers has already been output from the buffer circuit.

* * * * *